US009683075B2

(12) United States Patent
Haan et al.

(10) Patent No.: US 9,683,075 B2
(45) Date of Patent: Jun. 20, 2017

(54) PROCESS FOR THE CONTINUOUS PRODUCTION OF POLYESTERS

(75) Inventors: Robert Edgar Haan, Gorinchem (NL); Peter Paul Jansen, Oss (NL); Siebe Cornelis De Vos, Arnhem (NL); Jan Van Breugel, Woudrichem (NL); Peter Willi Kreis, Winterthur (CH); Sarah Borer, Winterthur (CH)

(73) Assignees: Purac Biochem B.V., Gorinchem (NL); Sulzer Chemtech AG, Winterthur (CH)

( * ) Notice: Subject to any disclaimer, the term of this patent is extended or adjusted under 35 U.S.C. 154(b) by 0 days.

(21) Appl. No.: 13/056,395

(22) PCT Filed: Jul. 29, 2009

(86) PCT No.: PCT/EP2009/059806
§ 371 (c)(1),
(2), (4) Date: May 19, 2011

(87) PCT Pub. No.: WO2010/012770
PCT Pub. Date: Feb. 4, 2010

(65) Prior Publication Data
US 2011/0263799 A1   Oct. 27, 2011

(30) Foreign Application Priority Data
Jul. 31, 2008 (EP) .................................. 08161553

(51) Int. Cl.
*C08G 63/08* (2006.01)
*C08G 63/78* (2006.01)

(52) U.S. Cl.
CPC ............ *C08G 63/785* (2013.01); *C08G 63/08* (2013.01)

(58) Field of Classification Search
CPC .... C08G 63/785; C08G 63/823; C08G 63/08; C08G 63/78
USPC .............................. 526/64; 528/354; 422/132
See application file for complete search history.

(56) References Cited

U.S. PATENT DOCUMENTS 4,314,606 A   2/1982   Muller
5,484,882 A   1/1996   Takada 6,114,495 A   9/2000   Kolstad
6,166,169 A   12/2000  Fritz
6,353,086 B1  3/2002   Kolstad
2007/0137488 A1*  6/2007   Streiff .............................. 96/218

FOREIGN PATENT DOCUMENTS

| DE | 4412317 A1 | 10/1994 |
| EP | 0916684 | 5/1999 |
| EP | 2098551 | 9/2009 |
| GB | 2 277 324 | * 10/1994 |
| JP | 1060101 | 3/1988 |
| WO | WO 94/06856 | 3/1994 |
| WO | 9631506 | 10/1996 |
| WO | WO 99/50345 | 10/1999 |

OTHER PUBLICATIONS

Okamoto et al. "Two-Step Process for Continuous Polymerization of Polylactic acid"; Jun. 20, 2008.*
Garlotta "A Literature Review of Poly(Lactic Acid)" Journal of Polymers and the Environment, vol. 9, No. 2, Apr. 2001,pp. 63-84.*
European Search Report of the European Patent Office Patent Office in counterpart foreign application No. PCT/EP2009/059806 filed Jul. 29, 2009.
Written Opinion of the European Patent Office Patent Office in counterpart foreign application No. PCT/EP2009/059806 filed Jul. 29, 2009.

* cited by examiner

*Primary Examiner* — Ling Choi
*Assistant Examiner* — Gennadiy Mesh
(74) *Attorney, Agent, or Firm* — Peter J. Ims; Westman, Champlin & Koehler, P.A.

(57) ABSTRACT

Continuous process of forming aliphatic polyesters The process includes continuously providing cyclic ester monomer and polymerization catalyst to a continuous mixing loop reactor (CMLR) having static mixing elements and operated at a temperature between 100 and 240° C. to form a pre-polymerized reaction mixture. The conversion is between 40 and less than 90 wt. %, wherein the cyclic ester monomer comprises lactide having a free acid content lower than 50 milli-equivalents per kg. The pre-polymerized reaction mixture is continuously provided to a plug flow reactor that is a static mixer reactor having static mixing elements and is operated at a temperature between 110-240° C., wherein the reaction mixture is polymerized to a conversion of at least 90%, to form polymer wherein the flow ratio of the CMLR and the plug flow reactor is between 1.5 an d50. The process includes continuously removing polymer from the plug flow reactor devolitizing the polymer.

18 Claims, No Drawings

PROCESS FOR THE CONTINUOUS PRODUCTION OF POLYESTERS

CROSS-REFERENCE TO RELATED APPLICATION

This Application is a Section 371 National Stage Application of International Application No. PCT/EP2009/059806, filed Jul. 29, 2009 and published as WO 2010/012770 A1 on Feb. 4, 2010, in English.

BACKGROUND

The discussion below is merely provided for general background information and is not intended to be used as an aid in determining the scope of the claimed subject matter.

Aspects of the present invention pertain to a process for the continuous production of polyesters, in particular aliphatic polyesters, from cyclic ester monomers.

Aliphatic polyesters based on cyclic ester monomers such as lactide (L-lactide, D-lactide, rac-lactide, also referred to as DL-lactide, meso-lactide), glycolide, trimethylene carbonate (TMC), epsilon-caprolactone, and p-dioxanone, and combinations thereof have many attractive properties. They often have high biocompatibility and attractive resorbability properties, which makes them suitable for the preparation of scaffolds and implants for use in human or animal bodies, such as for example for fixation elements, films, membranes, suture thread or also for pharmaceutical drug delivery systems. Further, in particular, polylactide, also referred to as polylactic acid, is a promising material in the field of biobased polymers for, e.g., packaging material. The fact that it can be derived from renewable resources makes it particularly attractive as a sustainable alternative for polymers derived from oil.

Polymerisation processes for preparing aliphatic polyesters such as polylactide are known in the art. They include ring-opening polymerisation processes and polycondensation processes. It has been found that the polylactic acid obtained through polycondensation processes is of limited value because polycondensation does not yield the required high molecular weight polyesters.

Accordingly, (co)polyesters are preferably prepared by ring-opening polymerisation of the corresponding cyclic monomers, such as L-lactide, D-lactide, DL-lactide or rac-lactide, meso-lactide, glycolide, trimethylene carbonate, epsilon-caprolactone, and p-dioxanone, or mixtures thereof.

Therefore, most publications on processes for the production of polylactide disclose a first step wherein lactic acid is polymerised to form a pre-polymer through condensation, which pre-polymer is subsequently depolymerised by means of a catalyst to form crude lactide (i.e. the ring-closure reaction). The crude lactide is purified, and the purified lactide is used as monomer in the preparation of polylactide by ring-opening polymerisation. For the purpose of this description the terms polylactide and polylactic acid are used interchangeably.

Although the literature on the production of polyesters such as polylactide is abundant, most publications are silent on the specific equipment to be used on industrial scale. They mainly focus on laboratory scale. In most publications, the preparation of lactide from lactic acid and the subsequent purification of the lactide are described in detail, while for the ring-opening polymerisation of cyclic ester monomer (e.g. lactide) to form the corresponding polyester, e.g., polylactide, only temperature and catalyst are described.

Polymerisation processes for manufacturing polyesters can be divided into two groups, viz. polymerisation in the presence of a water-free solvent, e.g., suspension or emulsion polymerisation, and polymerisation in the substantial absence of solvent, e.g., melt polymerisation, carried out at a temperature above the melting temperature of the monomer and polymer, or mass polymerisation, carried out—in batch—at a temperature below the melting temperature of the polymer.

In general, polyesters are all made in the absence of solvent—bulk—by polycondensation and in some special cases, when the cyclic ester monomer is already dehydrated, by ring-opening polymerisation. Commonly used processes are performed batch-wise and the conversion is followed by monitoring increase of melt viscosity and reduction of carboxylic acid end group concentration. This classic approach is used for many polyesters, from rosin-based printing ink resins, via powder coating polyester resins to prepolymers for PET yarn. The latter are subjected after melt-polymerisation to solid-state post-polymerisation (SSP) in order to increase the average molecular weight to values that are not achievable in the molten state. Although SSP is a time-consuming process, it is inevitably applied broadly on industrial-scale.

A major problem which is often encountered in the polymerisation in the absence of solvent of cyclic ester monomers to polyesters, e.g., the polymerisation of lactide monomers to polylactide, is the removal of the heat generated during the exothermic polymerisation reaction. Polyesters such as polylactide have a relatively low thermal conductivity. For example, the thermal conductivity of polylactic acid is 0.13 W/(m·K). For other polymers and rubbers, values of the same order have been reported. This means that the heat generated by the reaction cannot always effectively be removed, especially in large vessels, stirred tanks, and the like. This can lead to local overheating of the resulting polymer, causing chain degradation and discolouration of the polymer. In conventional processes the process settings are chosen such that reaction rates are low and residence times are long. This leads to voluminous and expensive equipment. Other conventional processes do not provide high quality, i.e. high molecular weight, polyester, e.g., polylactide, with a low yellowness index with low residual lactide content in high yields.

A further problem which is encountered in the solvent-free ring-opening polymerisation of cyclic ester monomers is the difference in melt viscosity between the monomer melt and the polymer melt. In WO 99/50345 it is suggested to use a plug flow reactor or a series of plug flow reactors for the polymerisation process. We have found that when using a plug flow reactor, for example for lactide polymerisation, the difference in melt viscosity between the molten cyclic ester monomer (in this example the lactide), and the resulting polyester (in this example the polylactide) is so high that plug flow conditions cannot be maintained and channelling occurs.

Since no appropriate solutions to the problems mentioned above have been disclosed, there remains a need for a continuous process for manufacturing high molecular weight polymers in high quality from cyclic ester monomers in an economically attractive manner on industrial scale.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

In accordance with an aspect of the present invention, this need is addressed by the provision of a continuous process for the ring-opening polymerisation of cyclic ester monomers at a temperature between 100-240° C. which comprises: a) continuously providing cyclic ester monomer and polymerisation catalyst to a continuous mixing reactor, the reactor being operated at conditions effective for polymerisation to form a pre-polymerised reaction mixture, b) continuously removing pre-polymerised reaction mixture from the continuous mixing reactor and continuously providing pre-polymerised reaction mixture to a plug flow reactor, the plug flow reactor being operated under polymerisation conditions, wherein the reaction mixture is polymerised to a conversion of at least 90%, to form polymer c) continuously removing polymer from the plug flow reactor.

The number average molar mass (Mn) of the final product in gram/mole is generally at least 10 000 g/mol, more in particular at least 30 000 g/mol, still more in particular at least 50 000 g/mol. The upper limit of the molar mass is not critical to the process according to the invention. Generally it is below 500 000 g/mol, more specifically below 300 000 g/mol.

The ring-opening polymerisation is generally carried out at a temperature of at least 100° C., in particular at least 150° C. The polymerisation temperature is generally at most 240° C., in particular at most 220° C., still more in particular at most 200° C. The temperature in both reactors may be the same or different. It should in both cases be sufficiently high for the medium present in the reactor to be in the liquid phase.

DETAILED DESCRIPTION

An aspect of the present invention pertains to polymerisation carried out in the substantial absence of solvent, namely to melt-polymerisation. If so desired minor amounts of solvent may be present in the process, e.g. added as a solvent for the catalyst or further reaction components. The process is intended to encompass situations where the reaction mixture contains less than 5 wt. % of solvent for the polymer, in particular less than 2 wt. %, more in particular less than 1 wt. %, still more in particular less than 0.5 wt. %.

Pressure is not critical to the reaction. The pressure applied will be appropriate to ensure flow of the liquid reactor components through the reactor. It is within the scope of the skilled person to determine suitable reaction pressure.

Both the pre-polymerisation in the continuous mixing reactor and the further polymerisation in the plug flow reactor are preferably performed in inert conditions, such as under a dry nitrogen or argon blanket.

It was found that with the process according to the invention residence times of less than three hours, more in particular less than two hours, still more in particular less than one hour, at temperatures below 200° C. with conventional amounts of catalyst sufficed to obtain a conversion of at least 90%, in particular at least 93%, more in particular at least 97%, still more in particular to within 1% of the chemical equilibrium conversion. This is significantly faster than the polymerisation time of conventional processes where 10 hours and more are mentioned. Reference is made, for example, to "Two step process for continuous polymerisation of polylactic acid" N. Okamoto, T. Matuso, Journal of Chemical Engineering of Japan, Vol. 41, No. 6, pp. 474-484, 2008.

The residence time is calculated from the entry of the monomer in the continuous mixing reactor to the removal of the polymer from the plug flow reactor.

In the first step of the process, cyclic ester monomer and polymerisation catalyst are continuously provided to a continuous mixing reactor. Suitable continuous mixing reactors include continuous stirred tank reactors and loop reactors, both of which are known in the art.

The use of a loop reactor may sometimes be preferred. Loop reactors are conventionally used for preparation of polyolefins such as polypropylene and other addition polymers like polystyrene, polymethyl methacrylate, or styrene acrylonitrile copolymers. In one embodiment, a loop reactor is used which comprises static mixing elements. This will ensure good homogeneity of the reaction mixture comprising polymerised products in combination with optimal removal of reaction heat. In the loop reactor, the added monomer and catalyst are intimately mixed with partially polymerised product that is already present in the reactor. One beneficial result of this is that the rheological behaviour of the reaction mixture only changes gradually within the loop reactor. This helps controlling the fluid flow within the reactor. Major jumps in viscosity over short distances are avoided and the heat released by the reaction is distributed uniformly in the reactor. Due to the increased flow rate and the mixing elements that are preferably present, the rate of heat removal from the reactor is significantly enhanced, further helping in the control of reaction conditions. More in particular, the combination of high flow rate and mixing elements results in enhanced temperature homogeneity, and thus a more even temperature distribution in the loop reactor. It also results in a narrow residence time distribution. Hot spots are avoided so there is less discoloration of the polymer.

The intimate mixing in the loop reactor is also responsible for the reduced residence time necessary for this polymerisation reaction. Therefore this reactor design leads to a significant process intensification as compared to other techniques.

In the continuous mixing reactor, the reaction mixture is pre-polymerised. The conversion in the continuous mixing reactor is generally at least 5%, more in particular at least 10%. The conversion may be as high as 40%, or even %. The conversion is generally below 90%, more in particular at most 85%. The conversion aimed for in the continuous mixing reactor will, int. al., depend on the viscosity of the reaction mixture.

Pre-polymerised reaction mixture is continuously withdrawn from the continuous mixing reactor and continuously provided to a plug flow reactor, where it is polymerised further to a conversion of at least 90%. In the plug flow reactor, which is preferably equipped with static mixing elements, the polymerisation can be completed up to high conversion rates. The static mixing elements used here provide for further intense mixing and homogeneous temperature distribution. Due to this, the molecular weight distribution, degree of conversion, and residence time distribution can be tightly controlled. Further more, the temperature profile of the reaction along the plug flow reactor can be controlled to a high degree, enabling optimisation of the polymerisation process.

In one embodiment, the loop reactor and/or the plug flow reactor are static mixer reactors. That is, reactors equipped with static mixing elements. Suitable static mixing elements are described in U.S. Pat. No. 4,314,606.

The reactants provided to the continuous mixing reactor include cyclic ester monomer and polymerisation catalyst. If so desired, additional components such as co-catalyst, initiator for molecular weight control and/or additives may also be added. The components can be added to the reactor directly, either per se or in a solvent, or (some of) the reactants may be combined prior to addition to the continuous mixing reactor.

Suitable cyclic ester monomers are monomers encompassing 5-7 covalently linked carbon atoms in the ring, at least one, generally one or two, oxygen atoms in the ring, and a carbonyl oxygen atom substituted onto the carbon atom adjacent to the oxygen atom in the ring (generating together the ester linkage). Where there are more than one oxygen atoms in the ring, oxygen atoms may be substituted on the adjacent carbon atoms for all oxygen atoms, or just for one. The carbon atoms in the ring may be substituted with C1-C4 alkyl groups. Suitable monomers include lactide, glycolide, trimethylene carbonate, epsilon-caprolactone, p-dioxanone and mixtures thereof. Where more than one type of monomer is used, a polyester copolymer will be obtained. Where in the present specification mention is made of polymer, copolymer is also encompassed, unless specifically excluded.

Lactide is a typical cyclic ester monomer to be used as starting material, whether or not in combination with one or more of glycolide, trimethylene carbonate, and epsilon-caprolactone. The lactide used in the present invention may be L-lactide (derived from two L-lactic acid molecules), D-lactide (derived from two D-lactic acid molecules), meso-lactide (derived from an L-lactic acid molecule and a D-lactic acid molecule), or a mixture of two or more of the above. A 50/50 mixture of L-lactide and D-lactide with a melting point of about 126° C. is often referred to in the literature as D,L-lactide or rac-lactide.

In one embodiment of the present invention, the lactide used as starting material is L-lactide with up to 50% of other lactides. For example, the lactide used as starting material may be L-lactide containing between 50 and 10% D-lactide. In another embodiment, the lactide is substantially pure L-lactide, where the wording substantially pure means that it may contain up to 10 wt. % of other lactides, for example, up to 5 wt. %, or up to 1 wt. %. In a further embodiment, the lactide is substantially pure D-lactide, where the wording substantially pure means that it may contain up to 10 wt. % of other lactides, for example, up to 5 wt. %, or up to 1 wt. %.

In a further embodiment, D,L lactide and/or D lactide are polymerised with L lactide to form polymers with an L/D monomer ration of at least 1:1.

In a preferred embodiment high quality lactide is used.

High quality lactide is defined here as lactide with a low free acid content and a low water content: the free acid content should be lower than 50 milli-equivalents per kg (meq/kg), preferably lower than 20 meq/kg and most preferably lower than 10 meq/kg. The water content should be lower than 2000 ppm, preferably lower than 500 ppm, more preferably lower than 200 ppm and even more preferably lower than 100 ppm. The use of high quality lactide ensures the economical production of polylactide with a low yellowness index with a high polymerisation rate and with good average molecular weight control.

Depending on the embodiment, the monomers may be provided to the continuous mixing reactor in solid or liquid form. Where the continuous mixing reactor is a loop reactor, the monomers should be provided in liquid form. Where the continuous mixing reactor is a continuous stirred tank reactor, providing the monomers in the solid phase may be considered.

Where the monomers are to be provided to the continuous mixing reactor in the liquid state, they can be molten, for example, in a melt tank or extruder, as in known in the art.

In addition to the cyclic ester monomer, polymerisation catalyst is added. Suitable catalysts for use in the invention are known in the art. In one embodiment of the present invention, lactide is polymerised with a catalyst of the formula

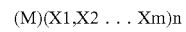
(M)(X1,X2 ... Xm)n where M is selected from metals of Group 1, 2, 4, 8, 9, 10, 12, 13, 14, and 15 of the Periodic Table of Elements, (X1, X2 ... Xm) are independently selected from the group of alkyls, aryls, oxides, carboxylates, halides, alkoxides, alkylesters, m is an integer ranging from 1 to 6, and n is an integer ranging from 1 to 6, wherein the values for m and n depend on the oxidation state of the metal ion.

Within Group 1, the use of Na is preferred. Within Group 2 the use of Ca is preferred. Within Group 4 the use of Ti is preferred. Within Group 8 the use of Fe is preferred. Within Group 12 the use of Zn is preferred. Within Group 13 the use of Al, Ga, In, and Tl may be mentioned. Within Group 14 the use of Sn and Pb is preferred. Within Group 15 the use of Sb and Bi is preferred. In general, the use of metals of Groups 4, 14 and 15 is preferred. It is preferred for M to be selected from Sn, Pb, Sb, Bi, and Ti. The use of a Sn-based catalyst may be particularly preferred for cyclic ester monomers.

For halides, tin halides like SnCl2, SnBr2, SnCl4, and SnBr4 may be mentioned. For oxides, SnO and PbO may be mentioned. Within the group of alkylesters, octoates (=2-ethyl hexanoates), stearates, and acetates may be mentioned, e.g., in the form of Sn-octoate, (also known as Sn(II) bis 2-ethyl hexanoate), Sn-stearate, dibutyltin diacetate, butyltin tris(2-ethyl hexanoate), Sb (2-ethyl hexanoate), Bi (2-ethyl hexanoate), Sb triacetate, Na (2-ethyl hexanoate), Ca stearate, Mg stearate, and Zn stearate.

Other suitable compounds include tetraphenyltin, Sb tris (ethylene glycoxide), aluminum alkoxides, and zinc alkoxides.

The catalyst concentration is generally at least 5 ppm, calculated as metal weight, more in particular at least 10 ppm. Where larger than conventional amounts are used, the catalyst concentration is at least 30 ppm, more in particular at least 50 ppm. The catalyst concentration is generally at most 200 ppm, in particular at most 150 ppm.

The use of Sn(II)-bis(2-ethylhexanoate), also indicated as tin octoate, may be preferred, since this material is commercially available, liquid at room temperature and reaction temperature, and soluble in liquid lactide. Further, the compound has received FDA approval for many conventional end-uses.

If so desired, co-catalyst may be added to the lactide and the catalyst, that is, a compound that further increases the polymerisation rate. Suitable co-catalysts are known in the art. Reference is made, for example, to U.S. Pat. No. 6,166,169. This reference describes co-catalysts of the formula

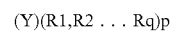
(Y)(R1,R2 ... Rq)p where Y is an element selected from group 15 or 16 of the periodic system, (R1, R2 ... Rq) is a substituent, selected from one of the compound classes of alkyls, aryls, oxides, halogenides, oxyalkyls, aminoalkyls, thioalkyls, phenoxides, aminoaryls, thioaryls, q is a whole number ranging from 1 to 6, and p is a whole number ranging from 1 to 6. The co-catalyst is generally used in an amount of the same order as the amount of catalyst, e.g., in a molar ratio of catalyst to co-catalyst of 50:1 to 1:50. U.S. Pat. No. 6,166,169 indicates that the co-catalyst preferably includes a phosphorous compound, in particular P(R1, R2, R3)3 with R1, R2, R3 being independently selected from aryl and alkyl groups. P(Ph)3 is indicated to be particularly preferred. Selection of an appropriate co-catalyst, initiator and optional additives such as anti-oxidants, phosphates, epoxidised vegetable oil, plasticisers etcetera, is within the scope of the person skilled in the art.

In step b) of the process, the polymerisation reaction is carried out further until a conversion of at least 90% is obtained, calculated on the starting lactide. More in particular, the polymerisation may be carried out until a conversion of at least 93% is obtained, more in particular at least 97%, still more in particular to within 1% of the chemical equilibrium conversion. Complete conversion of lactide is not possible for thermodynamic reasons. Maximum conversion will depend on reaction temperature and residence time. Lower residual monomer content, corresponding to higher conversion, will be obtained at lower polymerisation temperatures. The obtained conversion will generally be at most 98%. Conversion is to be determined directly after polymerisation.

The second part of the polymerisation can suitably take place in a plug flow reactor because the difference in viscosity of the pre-polymerised reaction product entering the plug flow reactor from the loop reactor and the polymer being removed from the plug flow reactor is small enough to avoid channelling. In addition, pronounced radial mixing will ensure a maximum driving force for the polymerisation reaction also where the conversion has advanced to cause a reduced concentration of reactants. As mentioned above, short residence times can be reached with this two-step polymerisation.

In one embodiment, the plug flow reactor is placed vertically or tilted. This decreases the chances of channelling or other type of flow maldistribution occurring.

The flow ratio of the continuous mixing reactor and the plug flow reactor is generally set between 1.5 and 50, more preferably between 1.5 and 15, most preferably between 1.5 and 12.

The polymer formed is continuously removed from the plug flow reactor.

In one embodiment the material thus obtained is subjected to a devolatilisation step to reduce the monomer content of the polymer. Prior to or simultaneously with the devolatilisation step the polymer may be subjected to a stabilisation step. Said stabilisation step comprises treatment of the polymer as obtained from the plug flow reactor with compounds that increase the stability of the compound against depolymerisation, discolouring and degradation in general. Examples of suitable compounds for stabilisation are organic peroxides, anti-oxidants such as phosphite-containing compounds, multi-functional carboxylic acids, hindered phenolic compounds, catalyst deactivating agents such as hindered alkyl, aryl and phenolic hydrazides, amides of aliphatic and aromatic mono- and dicarboxylic acids, cyclic amides, hydrazones and bishydrazones of aliphatic and aromatic aldehydes, hydrazides of aliphatic and aromatic mono- and dicarboxylic acids, bis-acylated hydrazine derivatives, heterocyclic compounds, endcapping with acetic anhydride, and mixtures thereof. The polymer is treated with the stabilisation compounds by admixing the stabilising compound with the polymer, e.g., at a temperature of the same order as the polymerisation temperature. This can be done by means of a static mixer, an extruder, or any other conventional way of mixing materials of which at least one is highly viscous.

If catalysts are used which are based on metal ions such as Sn(II), Pb(II), Sb(III), Bi (III), and Ti(II), it is preferred to use organic peroxides as stabilising compound against depolymerisation and melt viscosity reduction. It is believed that the combination of a catalyst of this particular type and a peroxide leads to a highly stable polymer composition, in particular polylactide composition. Within this embodiment the use of a Sn(II) catalyst may be particularly preferred. For further specification of suitable catalysts within this embodiment reference is made to what has been stated above.

In general, organic peroxides of the following groups can be used, provided that they meet the requirements above: dialkyl peroxides of the formula R—O—O—R', hydroperoxides of the formula R—O—O—H, peroxyesters of the formula R—(CO)—O—O—R', diacylperoxides of the formula R—(CO)—O—O—(CO)—R', peroxycarbonates of the formula R—O—(CO)—O—O—R', peroxydicarbonates of the formula R—O—(CO)—O—O—(CO)—O—R', and peroxyketals of the formula C(O—O—R)2R'R". In all of the above, R, R', and R" are organic alkyl or aryl groups with 1-20 carbon atoms, straight or branched, substituted or non-substituted, saturated or unsaturated, and whether or not provided with heteroatoms. Suitable peroxides are known in the art, and with the guidelines given above it is within the scope of the skilled person to select a suitable material. Suitable peroxides include benzoyl peroxide, dilauroyl peroxide, tert-butylperoxy-diethylacetate, tert-butylperoxy-2-ethyl hexanoate, tert-butylperoxy-isobutyrate, tert-butylperoxy-acetate, tert-butylperoxy-benzoate, and dibenzoyl peroxide.

The peroxide is generally added in an amount of at least 0.01 wt. %, in particular in an amount of at least 0.05 wt. %. The amount of peroxide added is generally at most 3 wt. %, in particular at most 2 wt. %.

If peroxides are used for the stabilisation of the polymer, or to create long-chain branched PLA, as known in the art, higher amounts of catalyst may be used than conventionally, to increase the reaction rate even more. These higher amounts are mentioned above.

As the presence of substantial amounts of monomer in the polymer may detrimentally affect the mechanical properties and processing behaviour of the polymer, the polymer is generally also subjected to a devolatilisation step. The devolatilisation step is carried out to remove volatiles, in particular unreacted monomer from molten or solid polymer. The volatiles are removed at increased temperature under reduced pressure, e.g. under vacuum. In the product that is obtained after the devolatilisation step, monomer, in the case of polylactide, lactide monomer, is generally present in an amount of less than 2 wt. %, more in particular in an amount of less than 1 wt. %, still more in particular in an amount of less than 0.5 wt. %. Examples of devolatilisers include extruders, especially twin screw extruders, wiped film evaporators, falling film evaporators, rotary devolatilisers, rotary disk devolatilisers, centrifugal devolatilisers, flat plate devolatilisers, and static expansion chambers involving special distributors, e.g., Sulzer devolatilisation technology as described in EP1800724. The use of a static expansion chamber is considered preferred. Devolatilisation in various stages and/or a combination of various types of apparatus is also possible. Stripping gas such as nitrogen can be applied to one or several stages in order to facilitate devolatilisation.

Devolatilisation may also be conducted in solid-state post-polymerisation equipment or by drying of solid pelletised product under vacuum or inert gas flow, e.g., in a tumble dryer. Optionally, a crystallisation step may be performed before the drying step.

After the devolatilisation step the polymer may be directly further processed to end-use by extrusion, blow-molding, film casting, film blowing, thermoforming, foaming, or fiber-spinning at elevated temperatures to form useful articles. If so desired, the polymer may be compounded with additives such as anti-oxidants nucleating agents, mineral fillers, glass or natural fibers, processing aids, UV-stabilisers, or other polymer additives known to the skilled person.

It is also possible to allow the polymer to solidify to form a solid intermediate product. For example, it may be converted to particles such as beads, chips or other pelletised or powdered products and then sold to end-users.

The ring-opening polymerisation process according to the invention provides polyesters, in particular polyesters, more in particular lactide-based polymers or copolymers, of controllable, consistent, and high quality in terms of molecular weight, polymer chain architecture, colour and residual monomer content. In the case that only optically pure lactides are used as cyclic ester monomer also a very high optical purity is obtained.

Aspects of the present invention are elucidated by the following Examples, without being limited thereto or thereby.

Comparative Example 1

L-Lactide (Purasorb L, ex PURAC Biomaterials) was molten batch-wise in a 50 liter tank under a nitrogen atmosphere. The molten lactide with a temperature of 110-125° C. was pumped continuously into an oil-heated, straight tubular polymerisation reactor by means of a piston pump at a flow rate of 3-6 kg/h. The internal volume of the straight polymerisation reactor was equipped with static mixing elements designed to provide intimate mixing and plug flow behavior. Temperature and pressure were recorded on 4 different point equally distributed along the linear polymerisation reactor.

The molten lactide was heated to the reaction temperature of 180-220° C. in the first part of the polymerisation reactor. Tin octoate polymerisation catalyst and dodecanol initiator were added to the molten lactide as a concentrated solution in toluene by means of an HPLC pump. Solution concentration and flow rate were adjusted to arrive at a typical catalyst concentration of 500 ppm $SnOct_2$ and a dodecanol concentration of 0.15 wt.-%, corresponding with a theoretical average Mn of 122 kg/mol of the PLLA at 100% conversion.

Ring-opening polymerisation started and melt viscosity increased accordingly while the mixture progressed through the linear tubular reactor.

The reaction mixture left the tubular reactor through a die plate with 1 circular hole mounted to the end of the reactor. The viscous strand was cooled in a water bath and pelletised by means of a strand pelletiser.

During lactide polymerisation, a varying pressure drop with a maximum value of 80 bars developed over the reactor. The temperature increased slightly just after the position where catalyst and initiator were added, indicating the onset of polymerisation. The increase of temperature of the melt by approximately 5° C. was caused by the inability of the oil circuit encasing the tubular reactor to absorb the heat generated by the exothermal polymerisation reaction.

Experiments demonstrated that this linear, tubular polymerisation reactor set-up with internal static mixers could not be operated in a steady-state condition. More in particular, the recorded mass temperature and pressure fluctuated unpredictably. The output of the reactor changed from polymer to melted lactide and back, and lactide sprayed out of the die. Metal analysis of the lactide that came out of the die revealed that it contained the expected amount of tin polymerisation catalyst, so it should polymerise. The observation that molten lactide (with catalyst) left the die means that the residence time of the lactide monomer in the reactor was too short for polymerisation to polylactide. Apparently, low viscous lactide found a small channel through the high viscous reaction mixture and escaped from the linear reactor prior to polymerisation.

Example 1 According to an Aspect of the Invention

L-lactide (Puralact L, ex. PURAC) was molten batch-wise in a 100 liter stirred tank with external oil heating under a nitrogen atmosphere. The molten lactide with a temperature of 110-125° C. was transferred under gravity and nitrogen pressure to a 200 liter feed tank. The lactide monomer in the feed tank was pumped continuously into a first oil-heated static mixer of the polymerisation reactor by means of a micro annular gear pump at a flow rate of 25 kg/h. A mixture of tin octoate polymerisation catalyst and hexanol initiator was continuously added to the molten lactide by means of a HPLC pump. The flow rate of the mixture was adjusted to arrive at a typical catalyst concentration of 200-300 ppm $SnOct_2$ and a hexanol concentration corresponding with a theoretical average Mn of 100 kg/mol of the PLLA at 100% conversion.

This first static mixer mixed the lactide with the catalyst and initiator and heated it to 170-190° C. The residence time in this first static mixer was 1-2 minutes, which is too short to build up significant melt viscosity.

Subsequently, the low viscous reaction mixture was provided to a further tubular polymerisation reactor with a loop configuration. The internal volume of the loop reactor was equipped with an array of internal static mixing elements, and a separate gear pump. The mass flow rate in this loop reactor was typically set at 250 kg/h. In the loop-reactor, the viscosity of the melt increases and conversion develops to approximately 80-85% in a steady-state situation. The loop reactor was operated at fairly constant polymerisation temperature chosen between 180 and 200° C. No significant temperature increase was recorded upon addition of the catalyst/initiator to the lactide monomer.

At the opposite side of the feeding zone, a linear, tubular plug flow reactor equipped with internal static mixing elements was connected to the loop reactor. Pre-polymerised material was continuously withdrawn from the loop reactor and provided to the plug flow reactor by means of a gear pump. A die plate with two circular holes was mounted to the end of the plug flow reactor. Highly viscous polymer left the reactor through the dies, and the polymer strands were cooled in a water bath and subsequently pelletised by means of a strand pelletiser. The obtained pellets were transparent, virtually colorless amorphous PLLA.

During lactide polymerisation in the cascade of polymerisation reactors equipped with internal static mixers, a constant pressure drop over the reactor developed, with a maximum value of up to 60 bars in the loop reactor, a maximum pressure of 40 bars at the pump side of the plug flow reactor and a constantly decreasing pressure towards the end of the reactor.

During polymerisation trials, temperature and pressure were stable for at least several hours and channeling of lactide was never observed. Thus, polymerisation of lactide could be performed consistently with this arrangement of polymerisation reactors equipped with internal static mixers.

The high-melting poly(L-lactide) collected from a stable operation of the process typically exhibited a D-isomer content of less than 0.4 wt %. Molecular weight analysis of the PLLA by means of size-exclusion chromatography (SEC) using chloroform as the eluent and PS calibration standards, revealed Mn values of 130-150 kg/mol, Mw values of 190-210 kg/mol and a polydispsersity of 1.4-1.5. Residual lactide content in the PLLA was 4-5 wt % if the plug flow reactor was operated at a temperature of approx. 190° C.

This example shows that the use of a combination of a loop reactor with internal static mixing element to effect pre-polymerisation and a plug flow reactor with internal static mixing elements to finalize the polymerisation results in a stable polymerisation process.

The invention claimed is:

1. A continuous process for the ring-opening polymerisation of cyclic ester monomers to form aliphatic polyesters which comprises the steps of:
   a) continuously providing cyclic ester monomer and polymerisation catalyst to a continuous mixing loop reactor being a static mixer reactor comprising static mixing elements, the reactor being operated at a temperature between 100-240° C. to form a pre-polymerised reaction mixture with a conversion of between 40 and less than 90 wt. %, the cyclic ester monomer comprises lactide, said lactide having a free acid content lower than 50 milli-equivalents per kg (meq/kg),
   b) continuously removing pre-polymerised reaction mixture from the continuous mixing loop reactor and continuously providing pre-polymerised reaction mixture to a plug flow reactor, being a static mixer reactor comprising static mixing elements, and the plug flow reactor being operated at a temperature between 100-240° C., wherein the reaction mixture is polymerised to a conversion of at least 90%, to form polymer, and wherein the flow ratio of the continuous mixing loop reactor and the plug flow reactor is between 1.5 and 50, and
   c) continuously removing polymer from the plug flow reactor, and wherein the polymer removed from the plug flow reactor is subjected to a devolatilisation step to reduce the monomer content of the polymer.

2. The process according to claim 1 wherein the flow ratio of the continuous mixing loop reactor and the plug flow reactor is between 1.5 and 15.

3. The process according to claim 1, wherein the plug flow reactor is placed vertically or tilted.

4. The process according to claim 1 wherein the cyclic monomer is selected from the group consisting of lactide (L-lactide, D-lactide, DL-lactide, meso-lactide), glycolide, trimethylene carbonate (TMC), epsilon-caprolactone, p-dioxanone, and combinations thereof.

5. The process according to claim 1 wherein the reaction mixture is polymerised in the plug flow reactor to a degree of conversion of at least 93%.

6. The process according to claim 1, wherein devolatilisation is carried out in a static expansion chamber.

7. The process according to claim 6, wherein devolatilisation takes place in more than one stage.

8. The process according to claim 1, wherein after the devolatilisation step the monomer content of the polymer is less than 2 wt. %.

9. The process according to claim 1 wherein prior to or simultaneously with the devolatilisation step, the polymer is subjected to a stabilisation step wherein the polymer is subjected to a catalyst deactivation treatment.

10. The process according to claim 1 wherein the cyclic ester monomer, the polymerisation catalyst, and optionally co-catalyst, initiator and/or additives are combined prior to feeding to the continuous mixing loop reactor.

11. The process according to claim 1 and wherein the polymerisation catalyst comprises tin octoate.

12. The process according to claim 1 and wherein the polymerisation catalyst is defined by the formula

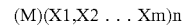

wherein M is selected from metals of Group 1, 2, 4, 8, 9, 10, 12, 13, 14, and 15 of the Periodic Table of Elements, wherein (X1, X2 ... Xm) are selected from the group consisting of alkyls, aryls, oxides, carboxylates, halides, alkoxides, alkylesters, wherein m is an integer ranging from 1 to 6, and wherein n is an integer ranging from 1 to 6.

13. The process according to claim 1 wherein the flow ratio of the continuous mixing loop reactor and the plug flow reactor is between 1.5 and 12.

14. The process according to claim 1 and wherein the polymer exiting from the plug flow reactor has a polydispersity of between 1.4 and 1.5.

15. A continuous process for the ring-opening polymerisation of cyclic ester monomers to form aliphatic polyesters which comprises the steps of:
   a) continuously providing cyclic ester monomer and polymerisation catalyst to a continuous mixing loop reactor being a static mixer reactor comprising static mixing elements, the reactor being operated at a temperature between 100-240° C. to form a re-polymerised reaction mixture with a conversion of between 40 and less than 90 wt. %, the cyclic ester monomer comprises lactide, said lactide having a free acid content lower than 50 milli-equivalents per kg (meq/kg) and a water content lower than 2000 ppm,
   b) continuously removing pre-polymerised reaction mixture from the continuous mixing loop reactor and continuously providing pre-polymerised reaction mixture to a plug flow reactor, being a static mixer reactor comprising static mixing elements, and the plug flow reactor being operated at a temperature between 100-240° C., wherein the reaction mixture is polymerised to a conversion of at least 90%, to form polymer wherein the flow ratio of the continuous mixing loop reactor and the plug flow reactor is between 1.5 and 50, and
   c) continuously removing polymer from the plug flow reactor.

16. A continuous process for the ring-opening polymerisation of cyclic ester monomers to form aliphatic polyesters which comprises the steps of:
   a) continuously providing cyclic ester monomer and polymerisation catalyst to a continuous mixing loop reactor being a static mixer reactor comprising static mixing elements, the reactor being operated at a temperature between 100-240° C. to form a pre-polymerised reaction mixture with a conversion of between 60 and less than 90 wt. %, the cyclic ester monomer comprises lactide, said lactide having a free acid content lower than 50 milli-equivalents per kg (meq/kg), b) continuously removing pre-polymerised reaction mixture from the continuous mixing loop reactor and continuously providing pre-polymerised reaction mixture to a plug flow reactor, being a static mixer reactor comprising static mixing elements, and the plug flow reactor being operated at a temperature between 100-240° C., wherein the reaction mixture is polymerised to a conversion of at least 90%, to form polymer wherein the flow ratio of the continuous mixing loop reactor and the plug flow reactor is between 1.5 and 15, and c) continuously removing polymer from the plug flow reactor.

17. The process according to claim 1 wherein the cyclic ester monomer is L-lactide and wherein the polymer collected from the process is poly(L-lactide) exhibiting a D-isomer content of less than 0.4% by weight of the total amount of the lactide present in the polylactide.

18. The process according to claim 1 wherein the conversion in the continuous mixing loop reactor is between 60 and less than 90 wt. %.

* * * * *